United States Patent [19]

Lescaut

[11] Patent Number: 5,650,226
[45] Date of Patent: Jul. 22, 1997

[54] METAL SUBSTRATE COATED WITH POLYAMIDE-BASED COATING POWDERS

[75] Inventor: Pierre Lescaut, Bernay, France

[73] Assignee: Atochem, Puteaux, France

[21] Appl. No.: 481,823

[22] Filed: Jun. 7, 1995

Related U.S. Application Data

[63] Continuation of Ser. No. 681,345, Apr. 8, 1991, abandoned, Division of Ser. No. 198,242, May 25, 1988, abandoned.

[30] Foreign Application Priority Data

May 25, 1987 [FR] France ................... 87 07345

[51] Int. Cl.$^6$ ............... B32B 15/08; B32B 15/16; B32B 15/18; B32B 15/20
[52] U.S. Cl. .......... 428/338; 428/332; 428/339; 428/458; 428/460; 428/461; 428/463
[58] Field of Search ................. 428/458, 460, 428/463, 475.8, 476.3, 477.4, 501, 506, 332, 338, 339; 427/27, 180, 195; 525/429

[56] References Cited

U.S. PATENT DOCUMENTS

| | | | |
|---|---|---|---|
| 4,075,369 | 2/1978 | Ferraro et al. | 427/195 |
| 4,163,030 | 7/1979 | Banucci et al. | 427/185 |
| 4,244,858 | 1/1981 | Tacke et al. | 525/429 |
| 4,286,021 | 8/1981 | Brendley, Jr. | 427/195 |
| 4,451,506 | 5/1984 | Kobayashi et al. | 427/239 |
| 4,476,277 | 10/1984 | Koyama et al. | 525/429 |
| 4,845,162 | 7/1989 | Schmitt et al. | 525/429 |

FOREIGN PATENT DOCUMENTS

| | | | |
|---|---|---|---|
| 582807 | 11/1946 | United Kingdom | 525/429 |
| 718493 | 11/1954 | United Kingdom | 525/429 |

*Primary Examiner*—D. S. Nakarani
*Attorney, Agent, or Firm*—Burns, Doane, Swecker & Mathis, L.L.P.

[57] ABSTRACT

Pulverulent coating compositions exhibiting excellent adhesion to metal substrates are formulated from a polyamide, e.g., nylon 6, nylon 11, nylon 12, or copolyamide thereof, and minor amounts of at least one phenolic polycondensate and/or at least one polyalkyl(meth)acrylate.

15 Claims, No Drawings

METAL SUBSTRATE COATED WITH POLYAMIDE-BASED COATING POWDERS

This application is a continuation of application Ser. No. 07/681,345, filed Apr. 8, 1991, now abandoned, which is a divisional of application Ser. No. 07/198,242, filed May 25, 1988, now abandoned.

BACKGROUND OF THE INVENTION

1. Field of the Invention

The present invention relates to novel polyamide-based pulverulent compositions well adapted for producing coatings by deposition and fusion of such compositions onto suitable substrates; this invention also relates to the substrates thus coated.

2. Description of the Prior Art

In French Patent No. 2,207,163, polyamide or copolyamide coating powders are described, the adhesion of which to metal substrates is improved by virtue of the addition, to the powder Composition, of a solid substance which has a dissolving effect on said polyamides and copolyamides when hot; such solid substances may consist of solid phenols, optionally combined with mono- or polyisocyanates or with isocyanurates.

Enhancing the adhesion of polyamide powders by the addition of a reactive epoxy resin and of a polyvinyl acetal thereto was proposed in U.S. Pat. No. 4,248,977.

SUMMARY OF THE INVENTION

A major object of the present invention is the provision of improvedly adherent polyamide-based pulverulent compositions, said compositions comprising, in addition to the polyamide, at least one phenolic polycondensate and/or at least one polyalkyl(meth)acrylate.

Another object of this invention is the provision of a substrate bearing a coating of the subject polyamide-based pulverulent composition on at least a portion of one of the face surfaces thereof.

Briefly, the present invention features a pulverulent composition comprising, per 100 parts by weight of polyamide:

(i) from 0 to 40 parts by weight of phenolic polycondensate (A); and (ii) from 0 to 40 parts by weight of polyalkyl(meth) acrylate (B), with the proviso that the total amount of additives (A)+(B) is at least 5 parts by weight per 100 parts by weight of polyamide.

DETAILED DESCRIPTION OF THE PREFERRED EMBODIMENTS OF THE INVENTION

More particularly according to the present invention, the subject composition preferably comprises, per 100 parts by weight of polyamide:

(i) from 0 to 25 parts by weight of phenolic polycondensate (A); and (ii) from 0 to 25 parts by weight of polyalkyl(meth) acrylate (B), with the proviso that the total amount of additives (A)+(B) is at least 10 parts by weight.

The average size of the grains or particles comprising the pulverulent compositions of this invention generally ranges from 5 to 500 µm and preferably from 10 to 250 µm.

The polyamides in the compositions according to the invention are many and varied.

Exemplary of such polyamides, the following are representative:

(a) polyamides produced from lactams or aminoacids, the hydrocarbon chains of which contain from 4 to 20 carbon atoms, such as, for example, caprolactam, oenantholactam, dodecanolactam, undecanolactam, 11-aminoundecanoic acid or 12-aminododecanoic acid;

(b) products of the condensation of a dicarboxylic acid with a diamine such as, for example, polyamides 66, 69, 610, 612 and 96, products of the condensation of hexamethylenediamine with adipic acid, azelaic acid, sebacic acid or 1,12-dodecanedioic acid, and of nonamethylenediamine with adipic acid; and (c) copolyamides resulting from the polymerization of the various above-mentioned monomers.

Among these polyamides, especially preferred are:

(1) polyamide 6 (nylon 6), obtained by polymerization of ε-caprolactam;

(2) polyamide 11 (nylon 11), obtained by polycondensation of 11-aminoundecanoic acid;

(3) polyamide 12 (nylon 12), obtained by polycondensation of 12-aminododecanoic acid or of dodecanolactam; and (4) copolyamides obtained by the polymerization of two or three of the above-mentioned monomers.

In general, the inherent viscosity of the polyamides (measured at 20° C. on a solution containing 0.5 g per 100 ml of metacresol) ranges from 0.20 to 2.0.

These polyamide powders may be produced in accordance with techniques which are now well known to this art, such as grinding granulates, dissolving granulates in hot solvents and precipitating them by cooling or else directly by using processes for anionic polymerization of the monomer(s) in solvents from which the polymer separates in powder form.

As utilized herein, by the expression "phenolic polycondensate" is intended the product resulting from the polycondensation of a compound containing at least one phenolic hydroxyl group with an aldehyde.

Exemplary of the above-mentioned compounds of phenolic type are, in particular, alkyl hydroxybenzoates, alkylphenols and dialkylphenols, dihydroxydiphenyls and halogenated phenols. Preferred hydroxybenzoates are those products of reaction of o-, m-, or p-hydroxybenzoic acid or of salicylic acid with an alcohol containing from 1 to 30 carbon atoms and preferably from 4 to 18 carbon atoms.

The alkyl phenols and dialkylphenols advantageously comprise alkyl groups having from 4 to 30 carbon atoms.

Exemplary compounds containing at least one hydroxyl group of the phenolic type, representative are (other than phenol itself):

(a) butylphenol, amylphenol, octylphenol, nonylphenol, dodecylphenol, stearylphenol, bisundecylphenol, dibutylphenol, bisdodecylphenol and distearylphenol;

(b) 2-ethylhexyl o- and p-hydroxybenzoates, butyl o- and p-hydroxybenzoates, octyl o- and p-hydroxybenzoates, dodecyl o- and p-hydroxybenzoates and stearyl o- and p-hydroxybenzoates; and (c) monochlorophenols, dichlorophenols and monobromophenols.

Formaldehyde, paraformaldehyde and benzaldehyde are especially representative aldehydes.

The preparation of the aforesaid phenolic polycondensates is amply described in the literature. Purely by way of example, this reaction may be conducted in the presence of an acidic catalyst (for example HCl, $H_2SO_4$ or $H_3PO_4$), at a temperature of from 80° C. to 180° C., using approximately from 0.5 to 1 mole of aldehyde per phenolic hydroxyl group.

Preferably, the phenolic polycondensates according to the invention have a degree of polycondensation that does not exceed 20 and, more preferably, ranges from 5 to 15.

The above-mentioned polycondensates may be used in the compositions according to the invention in the form of a powder, the size of which is as close as possible to that of the polyamide.

Also as utilized herein, by the expression "polyalkyl (meth)acrylate" is intended the product resulting from the polymerization or copolymerization of one or more alkyl (meth)acrylates containing 1 to 12 carbon atoms in the alkyl group of the monomer.

Alkyl esters of acrylic and methacrylic acids, in which the alkyl group emanates from an aliphatic alcohol and is, in particular, a methyl, ethyl, butyl, isobutyl, hexyl, heptyl, octyl, isooctyl or 2-ethylhexyl group, are especially representative of such monomers.

The expression "polyalkyl(meth)acrylate" also comprehends that product resulting from the copolymerization of one or more of the above-mentioned monomers with a polymerizable monomer bearing a functional group or otherwise. Exemplary of such monomers, representative are the aliphatic or aromatic hydrocarbons containing at least one olefinic double bond such as, in particular, styrene, mono- and dicarboxylic acids containing one olefinic double bond such as (meth)acrylic, crotonic, maleic, itaconic and fumaric acids, vinyl esters generally containing 5 to 15 carbon atoms, such as vinyl esters of versatic acids, compounds containing a hydroxyl functional group, such as 2-hydroxyethyl(meth)acrylate, 2-hydroxypropyl(meth)acrylate or 1-methyl-2-hydroxyethyl(meth)acrylate, compounds containing an epoxy group such as glycidyl(meth)acrylate, N-methylol(meth)acrylamide, and compounds containing an amino group, such as N,N-dimethylaminoethyl(meth)acrylate, N-tert-butylaminoethyl (meth)acrylate or N-tert-butylaminobutyl(meth)acrylate.

Polyalkyl(meth)acrylates having a molecular weight which generally ranges from 50,000 to 1,500,000 and preferably from 250,000 to 1,000,000 are generally employed.

These polymers, the preparation of which is described in the literature, may be used in the form of a powder whose particle size is as close as possible to that of the polyamide.

Of course, both in the case of the polyamide itself and in that of the phenolic polycondensate and polyalkyl(meth) acrylate, the uniformity which is recommended insofar as the particle size is concerned may be provided equally as well by mixing products which are already of said size or by grinding a mixture of products of different particle sizes. In a preferred embodiment of the invention, the various constituents, the particle sizes of which may be different, are blended dry, then the combination is melted, the product resulting therefrom is extruded, and the granulates produced, beginning with the lace which is thus extruded, are ground to the required size.

The novel compositions described above may also contain the usual additives for coating powders. Exemplary of such additives, and purely by way of example, the following are representative:

(1) pigments and colorants, such as titanium dioxide, carbon black, iron and cadmium oxides and organic colorants;

(2) antioxidants, such as hydroxyphenylhexamethylenediamine, tetrakis [methylene(3,5-di-t-butyl-4-hydroxy)hydrocinnamate] methane or N,N'-hexamethylenebis(3,5-di-t-butyl-4-hydroxy)hydrocinnamide;

(3) stabilizers, such as sodium hypophosphite or UV-absorbents;

(4) tension agents, namely, those promoting spreading, such as zinc oxide or acrylic resins surface-treated with silicon or organosilicon compounds;

(5) fillers, such as aluminum, magnesium and potassium silicates, calcium carbonate or, again, metal particles;

(6) plasticizers, such as butylbenzenesulfonamide;

(7) adhesion promoters such as phenol/epichlorohydrin/glycol polycondensates; and, generally, all of the inorganic, organic or macromolecular additives currently well known for modifying or imparting certain properties to the coatings.

In general, the compositions according to the invention may contain up to 100% by weight of additives relative to the weight of the polyamide, this proportion more generally ranging from 10 to 50%.

The subject compositions may be applied onto the substrate by electrostatic spraying, particularly when the substrate is metallic. Where this is the case, substrates made of steel, of galvanized steel, or copper, of aluminum or of aluminum alloy will advantageously be employed.

According to known technique, the metal substrate may have been subjected to one Or more of the following surface pretreatments, without this list being limiting:

coarse degreasing, brushing, fine degreasing, hot rinsing, phosphate treatment, chromate treatment, cold rinsing, chromic rinsing, mechanical scale removal and abrasive blasting.

The coating powder deposit may be applied directly onto the substrate. Alternatively, this substrate may have received a preliminary deposit of a primer solution or suspension, it being possible for the said primer to comprise, for example, an epoxy resin and/or phenolic resin optionally combined with a polyvinyl butyral or of an epoxyphenolic precondensate, or else of a combination of these mixtures and precondensates.

The deposit of the powder composition is generally applied onto the primer after the latter has dried.

In general, the thickness of the coating produced using the compositions according to the invention ranges from 5 to 500 μm.

The deposition of the composition onto the surface of the substrate is followed by heating to a temperature permitting the fusion of the polyamide composition and the formation of a continuous coating. Depending on the nature of the polyamide employed, the heating may, in particular, be carried out at from 100° to 300° C. for a period on the order of a few minutes, for example, from 1 to 30 min.

This operation is usually followed by cooling the coating with air or by immersion in water or any other suitable liquid.

The coatings produced using the compositions according to the invention exhibit a remarkable combination of properties. Independently of their excellent adhesion to the substrate, these coatings exhibit a high surface hardness and good resistance to abrasion, hot water, saline spray and hydrocarbons.

In order to further illustrate the present invention and the advantages thereof, the following specific examples are given, it being understood that same are intended only as illustrative and in nowise limitative.

EXAMPLE 1

A powder with a particle size below 0.1 produced by grinding granulates of a material prepared by melt-blending 100 parts by weight of polyamide 11 having an inherent viscosity of 1, and 20 parts by weight of polymethyl methacrylate was applied by means of the electrostatic field process onto a steel substrate, preliminarily degreased with a chlorinated solvent.

The metal which had been coated with powder in this manner was heated by passage through an oven regulated at 200° C., for a period of 6 minutes, in order to ensure the formation of a continuous protective film 150μ in thickness by melting the powder.

After cooling, the assembly was subjected, in a closed chamber, to the test of being sprayed with a water mist containing 5% of NaCl, at a temperature of 35° C.

After a test of 500 hours, the coating had retained good adhesion to the steel and no blistering or oxidation was observed.

EXAMPLE 2

100 parts by weight of powdered polyamide 11 having an inherent viscosity of 1, and a particle size below 0.1 mm, were mixed with 15 parts by weight of powdered alkylphenol with a particle size below 0.05 mm and were deposited by pneumatic spraying onto the outside of a steel pipe 200 mm in diameter and having a wall thickness of 5 mm, preheated to a temperature of 230° C.

The powder mixture melted in contact with the hot metal surface and formed a continuous film 350μ in thickness.

After complete cooling of the coated pipe, the latter was placed horizontally on the ground, continuously exposed to the external atmosphere.

After 3 years no modification was observed in the coating which remained adhering onto the metal, and this coating showed no alteration due to oxidation, decrease in thickness or perforation.

EXAMPLE 3

A powder with a particle size below 0.08 mm, produced by grinding a melt-blend of 100 parts by weight of polyamide 11 having an inherent viscosity of 1, 8 parts by weight of polymethyl methacrylate and 11 parts by weight of an alkylphenolic, was deposited by electrostatic spraying onto the inner wall of a steel pipe, preheated to 250° C., which had been subjected to mechanical scale removal producing a roughness of 0.05 mm and a deposition of 0.01 mm of primer consisting of phenolic resin combined with a vinyl butyral and a zinc chromate.

The total thickness of the coating thus obtained was 370 μm±50 μm.

5.1 liters of water containing 3% of NaCl and 0.9 liter of diesel fuel were placed in the pipe thus obtained, closed by means of blank flanges with seals at its ends and forming a volume of 9 liters. The assembly was successively subjected to pressures of 15 bars by the introduction of $H_2S$ and then 30 bars by the introduction of $CO_2$ and, lastly, 150 bars by the introduction of $CH_4$.

The assembly of pipe, fluids and gases was raised to a temperature of 70° C. and maintained for 10 days.

At the end of the test, the pressure was released over 15 minutes, corresponding to a decompression rate of 10 bars/minute.

This coating, deposited onto the walls, showed no change due to debonding, blistering or swelling, and the underlying metal showed no corrosion point, whether in the region containing the liquid phase or in that of the gaseous phase.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A metal substrate bearing on at least one surface thereof, an adhered coating comprising a major amount of polyamide particulates and a minor amount of a mixture of particulates of at least one phenolic polycondensate and, of at least one polyalkyl(meth)acrylate; wherein said phenolic polycondensate has a degree of polycondensation not exceeding 20.

2. The substrate as defined by claim 1, wherein said coating comprises 100 parts by weight of polyamide, an amount up to 40 parts by weight of phenolic polycondensate (A), and 40 parts by weight of polyalkyl(meth)acrylate (B), with the proviso that the total amount of additives (A)+(B) is at least about 5 parts by weight per 100 parts by weight of said polyamide.

3. The substrate as defined by claim 2, wherein said coating comprises 100 parts by weight of polyamide, an amount no more than about 40 parts by weight of phenolic polycondensate (A), and up to 40 parts by weight of polyalkyl(meth)acrylate (B), with the proviso that the total amount of additives (A)+(B) is at least about 10 parts by weight per 100 parts by weight of said polyamide.

4. The substrate as defined by claim 1, wherein said substrate comprises steel, copper, aluminum, or aluminum alloy.

5. The substrate as defined by claim 1, wherein said particulates have a size ranging from about 5 to about 500 μm.

6. The substrate as defined by claim 1, wherein said particulates have a size ranging from about 10 to about 250 μm.

7. The substrate as defined by claim 1, wherein said coating further comprises at least one colorant, antioxidant, stabilizer, tension agent, filler, plasticizer or adhesion promoter.

8. The substrate as defined by claim 1, wherein said phenolic polycondensate has a degree of polycondensation ranging from 5 to 15.

9. The substrate as defined by claim 1, wherein said phenolic polycondensate results from the polycondensation of a compound containing at least one phenolic hydroxyl group with an aldehyde.

10. The substrate as defined by claim 9, wherein said compound comprises at least one phenolic hydroxyl group comprising an alkyl hydroxybenzoate, alkylphenol, dialkylphenol, dihydroxydiphenyl or halogenated phenol.

11. The substrate as defined by claim 9, wherein said aldehyde comprises formaldehyde.

12. The substrate as defined by claim 1, wherein said polyamide particulates comprise nylon 6, nylon 11, nylon 12, or a copolyamide thereof.

13. The substrate as defined by claim 1, wherein said polyalkyl(meth)acrylate comprises a polymerizate of at least one alkyl(meth)acrylate containing 1 to 12 carbon atoms in the alkyl moiety thereof.

14. The substrate as defined by claim 13, wherein said polyalkyl(meth)acrylate comprises a polymerizate of at least one alkyl ester of acrylic or methacrylic acid in which the alkyl moiety comprises methyl, ethyl, butyl, isobutyl, hexyl, heptyl, octyl, isooctyl or 2-ethylhexyl.

15. A metal substrate bearing on at least one surface thereof, a coating comprising a major amount of polyamide particulates and a minor amount of a mixture of particulates of at least one polyalkyl(meth)acrylate and of at least one phenolic condensate.

* * * * *